United States Patent [19]

Fujimoto et al.

[11] Patent Number: 4,733,388
[45] Date of Patent: Mar. 22, 1988

[54] INFORMATION RECORDING DISC

[75] Inventors: Nobuyuki Fujimoto, Odawara; Shinichi Abe, Kanagawa; Yoshito Tsunoda, Mitaka; Kazuo Shigematsu, Saitama; Yasunori Kanazawa, Hachiouji; Toshinori Sugiyama, Ibaragi; Tetsurou Ikegaki, Toride, all of Japan

[73] Assignees: Hitachi Maxell, Ltd.; Hitachi, Ltd., both of Tokyo, Japan

[21] Appl. No.: 894,862

[22] Filed: Aug. 8, 1986

[30] Foreign Application Priority Data

Aug. 23, 1985 [JP] Japan .................. 60-184243
Nov. 19, 1985 [JP] Japan .................. 60-257855

[51] Int. Cl.$^4$ ............................ G11B 25/04
[52] U.S. Cl. ........................ 369/270; 369/290
[58] Field of Search ............ 369/270, 271, 289, 290

[56] References Cited

U.S. PATENT DOCUMENTS

| 2,806,704 | 9/1957 | Burdett | 369/290 |
| 3,430,966 | 3/1969 | Gregg | 369/270 |
| 4,322,841 | 3/1982 | Borchard et al. | 369/270 |
| 4,477,894 | 10/1984 | Clurman | 369/270 |
| 4,587,647 | 5/1986 | Mak et al. | 369/270 |

FOREIGN PATENT DOCUMENTS 469757 10/1935 United Kingdom ............ 369/271

Primary Examiner—Steven L. Stephan
Attorney, Agent, or Firm—Antonelli, Terry & Wands

[57] ABSTRACT

An information recording disc is provided with a magnetic attracting member in the form of metal piece or magnetic material which serves for attracting a disc member for recording, in particular, for optical recording and reproducing of information, to a spindle of a recording and reproducing apparatus. The magnetic attracting member is held in the space of a holder which is fixedly secured to the disc without the magnetic attracting member being fixedly secured to the disc. This arrangement enables a magnetic clamping of the disc member which provides for a decrease of retardation and is suitable for miniaturization of the apparatus.

9 Claims, 20 Drawing Figures

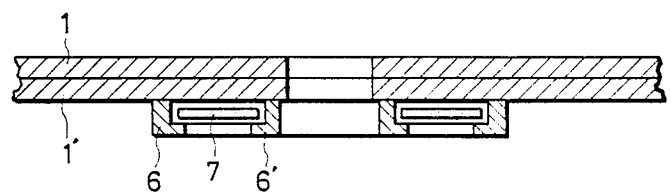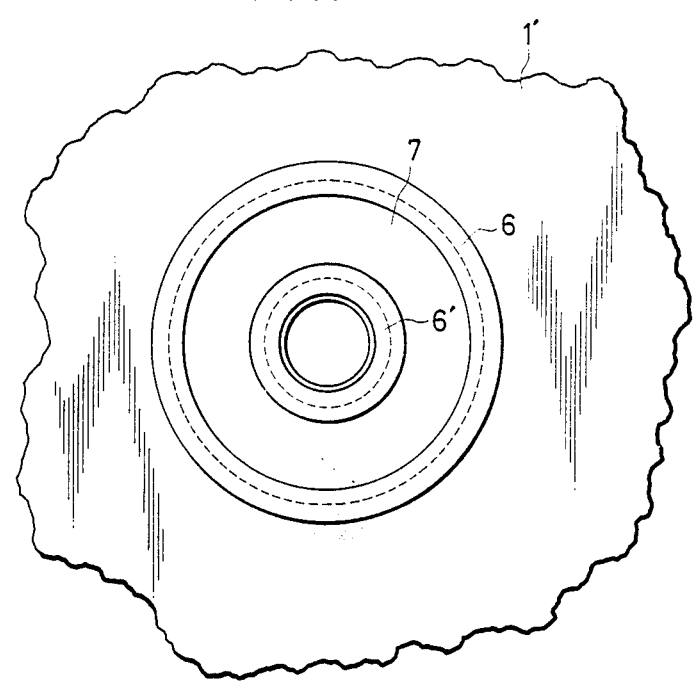

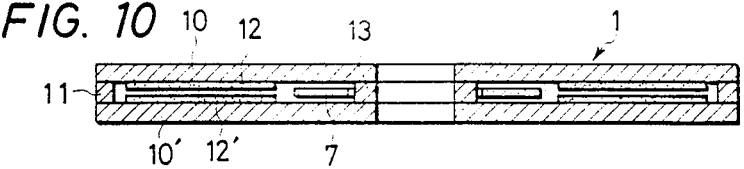
FIG. 10
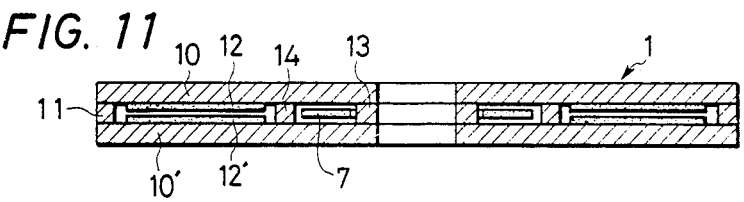
FIG. 11
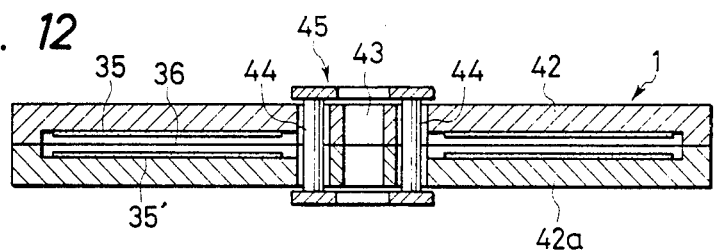
FIG. 12
FIG. 13
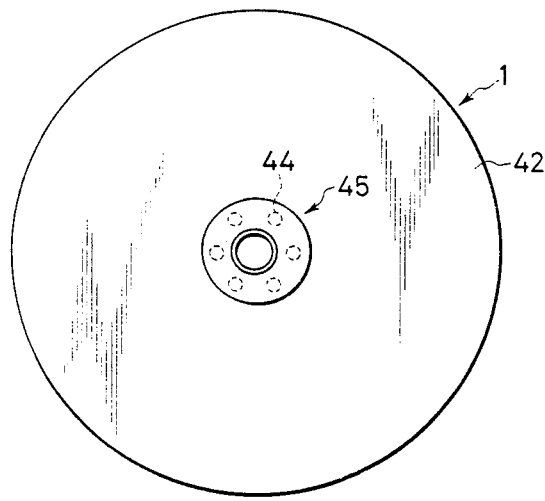

INFORMATION RECORDING DISC

BACKGROUND OF THE INVENTION

The present invention relates to an information recording disc for recording and reproducing information, in more detail, to an information recording disc (hereinunder referred to as a "disc") which is clamped to the turntable of a recording and reproducing apparatus by a magnetic attracting member and, more particularly, to the structure of a recording medium of an optical disc (hereinunder referred to as an "optical disc").

Conventionally, when an optical disc is mounted on a spindle of a recording and/or reproducing apparatus, a disc consisting of two substrates 1 and 1' are supported by the receiving surface of the spindle 2 and are pressed against the spindle 2 from above so as to be fixed by a fixing mechanism 3 (what is called mechanical clamp). All of the compact discs and optical video discs now on the market are of this type. The fixing mechanism 3, however, offers a problem in the attempt to reduce the apparatus in size and weight, because it is necessary to increase the thickness of the apparatus by the thickness of the fixing mechanism 3 plus the distance of travel of the fixing mechanism 3 which is required for moving it upward from the position shown in FIG. 1 when mounting and removing the disc. The fundamental structure of a means for solving this problem is shown in FIG. 2. An example of the means is described in detail in Japanese Laying Open of Utility Model application No. 138030/1984. This is a means for adhering a metal piece or a magnetic material 5 to the outside of the central portion of the disc consisting of the substrates 1 and 1', and attracting the disc by virtue of the attractive force of a magnetic material 4 provided on the spindle 2 (what is called magnetic clamp). As compared with the apparatus shown in FIG. 1, it dispenses with the need for the fixing mechanism 3 and the apparatus is reduced in thickness by that degree. However, when the means shown in FIG. 2 is put to practical use, there is a serious problem of the generation of retardation due to a change in the ambient temperature of the disc. The retardation is caused as a result of the generation of strain stress due to a difference in thermal expansion coefficient between the substrates 1, 1' and the magnetic attracting member adhered thereto, for example, the metal piece or magnetic material 5; it is what is called a photoelastic effect. The retardation disturbs the polarization of recording and reproducing light, thereby introducing deterioration of the recording and reproducing properties. From this reason the allowed value of retardation is considered to be 70 nm with respect to a commercial compact disc (CD) and an optical video disc, 40 nm with respect to what is called a DRAW (Direct Read After Write) type optical disc which is used for image filing and the like, and 10 nm with respect to a magneto-optic disc which detects a slight rotational angle ($\sim 0.35°$) of polarization. Discs having the structure shown in FIG. 2 were made such as not to exceed the allowed value and the retardations generated when the temperature was varied 40° C. were measured. The results are given in FIG. 3. The radius of the discs was 65 mm and the radius of the recording and reproducing region was 30 to 60 mm. The plastic material of the substrate was a polycarbonate resin. The curve a shows the retardation of a commercial plastic magnetic member A of 0.8 mm thick, and b that of a commercial plastic magnetic member B of 0.8 mm thick, the inner and outer diameter of both magnetic members are $\phi 15$ and $\phi 33$ mm, respectively. Both magnetic members A and B are composed of a plastic with magnetic materials dispersed therein, and have a thermal expansion coefficient closer to that of plastic than an ordinary metal piece or a magnetic material alone. The curve c shows the retardation of a small-diameter iron ring of 0.1 mm thick. The inner and outer diameters of the iron ring are $\phi 15$ and $\phi 20$ mm, respectively. As to the physical characteristic constants in relation to the generation of retardation, the photoelasticity of the polycarbonate resin is $5.5 \times 10^{-4}$ mm$^2$/kg, the thermal expansion coefficient thereof is $6.8 \times 10^{-5}$/deg, and the Young's modulus thereof is 240 kg f/mm$^2$, the thermal expansion coefficients of the plastic magnetic members A and B are $2.46 \times 10^{-5}$/deg and $3.0 \times 10^{-5}$/deg, respectively, and the Young's moduli thereof are 2,100 kg f/mm$^2$ and 1,170 kg f/mm$^2$, respectively. The thermal expansion coefficient of the iron ring is $1.2 \times 10^{-5}$/deg and the Young's modulus thereof is 20,000 kg f/mm$^2$.

Thus, even a plastic magnet generates a retardation of several hundred nm, and cannot therefore be used for a CD or optical disc which has the largest allowed value, much less a metal piece or a strong magnetic material having a smaller thermal expansion coefficient than a plastic magnet. This is approximately the same with the case in which the substrate material is replaced by an epoxy resin, which have approximately the same physical characteristic constants. If the substrate material is PMMA (poly methyl methacrylate), since the photoelastic constant of the PMMA is about 1/10 that of the polycarbonate resin, it is a little better but is far from being utilizable for a magneto-optic disc. FIG. 4 shows the calculated value of the retardation generated when a metal piece which has a thermal expansion coefficient different from that of the epoxy resin by as small as $0.3 \times 10^{-5}$/deg is adhered to the disc as the metal piece 5 shown in FIG. 2. The retardation in this case also exceeds the allowed value ($<10$ nm) of a magneto-optic disc. Thus, it has been found that adhesion of a metal piece or a magnetic material to a substrate is not practical at all.

SUMMARY OF THE INVENTION

Accordingly, it is an object of the present invention to eliminate the above-described defects in the prior art and to provide an optical information recording disc which allows a magnetic clamp suitable for miniaturization of the apparatus and which does not generate retardation.

To achieve this aim, an information recording disc according to the present invention is so designed that a magnet 4 attracts a substrate 1 simultaneously with a magnetic attracting member 5 (see FIG. 2) on the basis of the new finding that the generation of large retardation on a magnetic clamp type disc results from the adhesion of a magnetic attracting member, such as a metal piece or a magnetic material which has a different thermal coefficient from that of a substrate, to the substrate.

To sum up, the present invention is characterized in that a magnetic attracting member which is to be attracted by the spindle of a recording and reproducing apparatus is held by a substrate in an unfixed state therebetween.

The above and other objects, features and advantages of the present invention will become clear from the following description of the preferred embodiments thereof, taken in conjunction with the accompanying drawings.

BRIEF DESCRIPTION OF THE DRAWINGS

FIGS. 5 and 7 are sectional views of the structure of a first embodiment of the present invention;

FIG. 6 is a partially elevational view thereof;

FIGS. 8, 9, 10 and 11 are sectional views of the structures of second, third, fourth, and fifth embodiments, respectively, of the present invention;

Figs. 12, 13 are a sectional view and a partially plan view, respectively, of the structure of a sixth embodiment of the present invention;

DESCRIPTION OF THE PREFERRED EMBODIMENTS

Several embodiments of the present invention will be explained hereinunder with reference to FIGS. 5 to 20.

Figure 1:
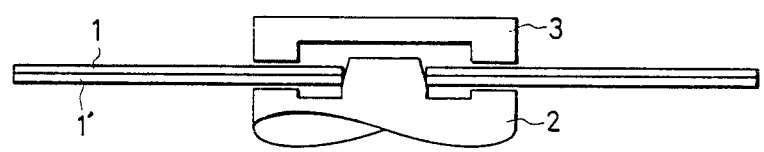
FIGS. 1 and 2 are sectional views of conventional discs.
Figure 2:
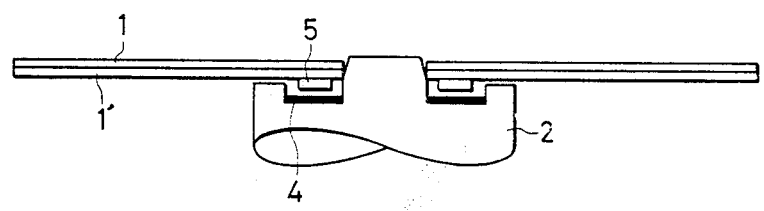
Figure 3:
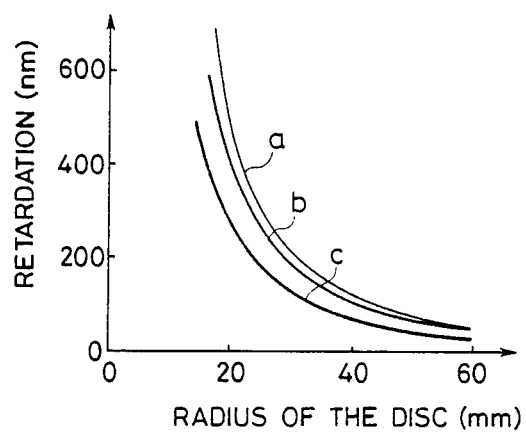
FIGS. 3 and 4 show the measured values and calculated values of the retardations generated on a substrate having the structure shown in FIG. 2.
Figure 4:
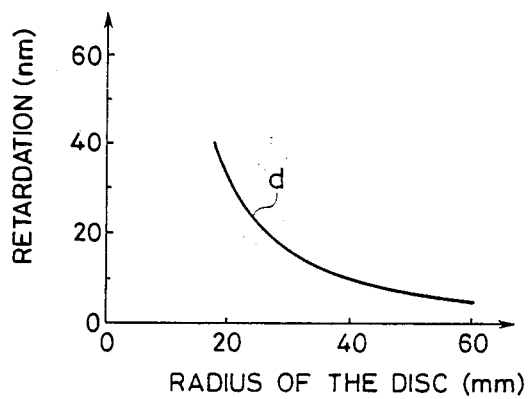
Figure 7:
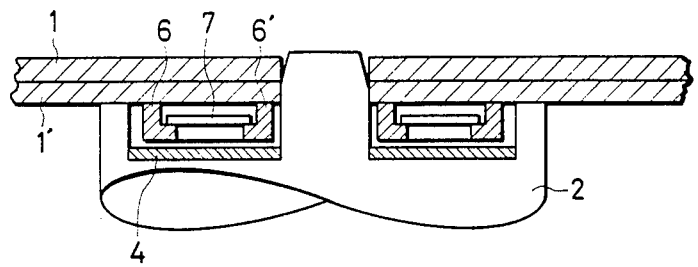

Referring first to FIG. 5 which is a sectional view of a first embodiment of the present invention, the reference numerals 1 and 1' denote substrates of an optical disc made of a plastic such as a polycarbonate resin, epoxy resin or PMMA. The illustrated disc is what is called a closely laminated type disc, and a recording film is inserted between the substrates 1 and 1'. The reference numeral 7 represents an annular magnetic attracting member (a first magnetic attracting member) such as a metal piece or a magnetic material, which is attached to the substrates with a space therebetween by annular L-shaped members 6 and 6'. As the metal piece or the magnetic material, a metal magnetic material such as Fe and Ni or the aforementioned plastic magnetic member is used. FIG. 6 shows the first embodiment shown in FIG. 5, viewed from the underside thereof. FIG. 7 is a schematic sectional view of the medium in accordance with this embodiment which is attracted to the spindle of a recording and reproducing apparatus. The annular metal piece or magnetic material 7 (first magnetic attracting member) is attracted by a magnetic attracting member 4 (a second magnetic attracting member) such as a magnet which is attached to the spindle 2. This attractive force is transmitted to the substrate 1' by the annular L-shaped members 6 and 6', so that the substrates are attracted to the spindle 2. The first magnetic attracting member which is attached to the disc with a space therebetween, at least the portion which comes into contact with the disc is coated with a resin material having self lubricating properties, for example, polyacetals which is effective for prevention of generation of dust due to abrasion of the disc surface and the magnetic attracting member during the operation. Although the closely laminated type disc is used in this embodiment, it will be understood that the same effect is produced on an air sandwich type disc and a disk such as a CD consisting of a single substrate. In this embodiment the metal piece or magnetic member 7 and the annular L-shaped members 6 and 6' are provided on a single side, but they may also be provided on the other side with respect to a double-sided disc. Furthermore, although both annular L-shaped members 6 and 6' are provided on both the inner and outer sides of the metal piece or magnetic material 7 in this embodiment, either of them is sufficient and they may not always be annular. For example, it is possible to arrange a plurality of L-shaped members on the circumference of the annular metal piece or magnetic material. The L-shaped members 6, 6' preferably have the same thermal expansion coefficient as that of the substrate and, more preferably, they are made of the same material as that of the substrate so as to limit the retardation to the retardation (1 to 2 nm) generated by a slight strain at the time of adhering the L-shaped members to the substrate.

Figure 8:
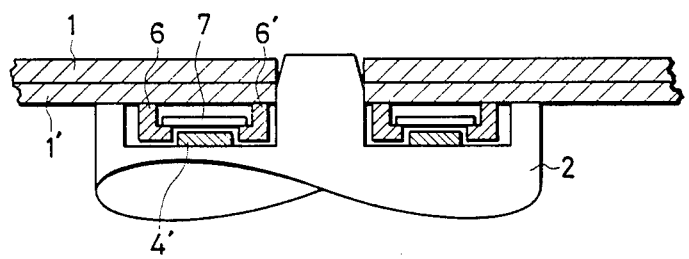

FIG. 8 shows a second embodiment, in which a magnet 4' is inserted into the space between the L-shaped members 6 and 6'. Since the magnet 4' is provided closer to the metal piece or magnetic member 7 in this case, it is possible to make the magnet comparatively smaller and since the magnet is accommodated within the L-shaped members, it is possible to reduce the size of the apparatus in the direction of height, thereby miniaturizing the apparatus.

Figure 9:
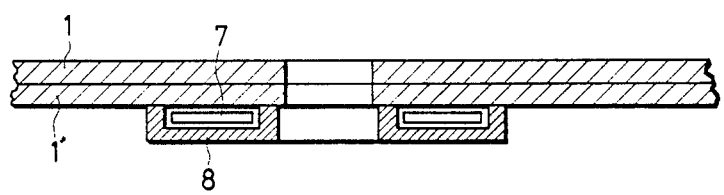

A third embodiment is shown in FIG. 9. In this embodiment, a U-shaped member is employed in place of the L-shaped members in the first embodiment so as to prevent the metal piece or magnetic material 7 from slipping off due to deformation of the L-shaped members and the other structure is the same as in the first embodiment. The annular metal piece or magnetic material 7 is attached to the substrate 1' in the state of being enclosed by a U-shaped member 8.

FIG. 10 shows a fourth embodiment of the present invention. In this embodiment, the optical disc recording medium is hollow, and has what is called an air sandwich structure. Two substrates 10 and 10' with recording films 12 and 12', respectively, deposited thereto are laminated by annular spacers 11 and 13 with the recording films 12 and 12' faced inward. The annular metal piece or magnetic material 7 is inserted into the hollow portion of the air sandwich structure, as shown in FIG. 10.

Referring to FIG. 11 which shows a fifth embodiment of the present invention, this embodiment is substantially the same as the fourth embodiment. An annular spacer 14 is further provided around the metal piece or magnetic material 7, thereby enhancing the strength of the medium in comparison with the fourth embodiment.

FIG. 12 is a sectional view of a sixth embodiment of an information recording disc in accordance with the present invention. The reference numeral 41 represents an information recording disc, 42 and 42a transparent substrates, 43 a center hole of the transparent substrates 42 and 42a, 44 a receiving hole provided around the center hole 43 for receiving an attracting member 45, 35 and 35' recording films made of a recording material, and 36 a gap between the recording films 35 and 35'.

The transparent substrates 42 and 42a are made of a transparent resin material such as polycarbonate or an epoxy resin, and the center hole 43 and the receiving hole 44 are formed through the transparent substrates from the top surface to the under surface. A plurality of the receiving holes 44 are provided on the circumferentially equidistant positions of each circle having the respective center holes 43 of the substrates 42 and 42a as its center. The receiving holes 44 are provided on each of the two substrates 42 and 42a such that the corresponding pairs of the holes 44 are communicated with each other in alignment when the transparent substrates 42 and 42a are bonded together.

Figure 14:
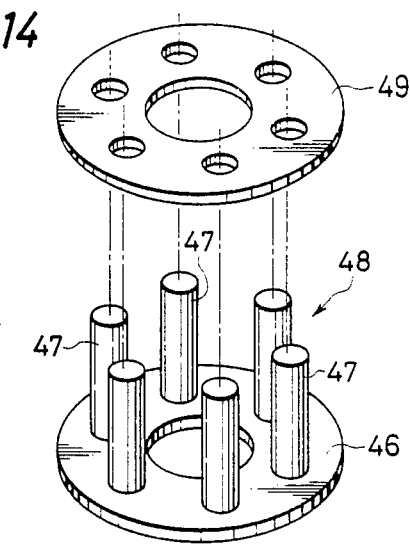
FIG. 14 shows the structure of an attracting member of the sixth embodiment.

The magnetic attracting member 45 is composed of, as shown in FIG. 14, a base plate 48 consisting of an annular metal magnetic attracting plate 46 and a plurality of connecting rods 47 which are implanted on one side of the metal magnetic attracting plate 46 such as to be inserted into the receiving holes 44, and another metal magnetic attracting plate 49 which is similar to the metal magnetic attracting plate 46. The connecting rod 47 has a diameter smaller than the diameter of the receiving hole 44 and a length slightly larger than the thickness of the disc 1. At least the portions of the metal magnetic attractive plates 46 and 49 of the magnetic attracting member 45 are made of a magnetic metal plate such as soft-iron and martensite stainless steel. The size of the connecting rod 47 is set so as to be capable of allowing, at least in the allowed temperature range, the difference in the amount of deformation in the radial direction resulting from the difference in thermal expansion coefficient between the transparent substrates 42 and 42a and the magnetic attracting member 45.

For example, if polycarbonate (the thermal expansion coefficient: $6.8 \times 10^{-5}$ mm/deg) is used as the material for the transparent substrates 42 and 42a; iron (the thermal expansion coefficient: $1.2 \times 10^{-5}$ mm/deg) is used as the material for the metal magnetic attracting plate 46 under the conditions that the difference in temperature during operation is 40° C., and the radius of the circle on the circumference of which the receiving holes 44 are provided is 20 mm, then the difference in thermal expansion between the transparent substrates 42, 42a and the metal magnetic attracting plate 46 is about 0.023 mm. Therefore, the diameter of the connecting rod 47 is made about 0.1 mm smaller than that of the receiving hole 44 with machining accuracy and influence of humidity being also taken into consideration.

When the magnetic attracting member 45 is attached to the information recording disc 1, the connecting rods 47 of the base plate 48 are first inserted into the receiving holes 44 from one side thereof, and the metal magnetic attracting plate 49 is next attached to the protruding ends of the connecting rods 47 from the other side. The connecting rods 47 and the metal magnetic attracting plate 49 are bonded together by a given known bonding means such as forcing, bolting, adhesion bonding, fusion bonding and snap-in fitting.

In the information recording disc 1 of this embodiment, since the small-diameter connecting rod 47 is loosely fit into the receiving hole 44, the connecting rod 47 is not forced to be pressed against the wall surface of the receiving hole 44 by dimensional change of the transparent substrates 42, 42a caused by a change in temperature or humidity. Consequently, there is no strain on the transparent substrate 1 which will cause inconvenience such as wavefront aberration or change in plane of polarization. Thus the information recording disc 1 of this embodiment is constantly able to record and reproduce a normal information signal in no matter what temperature range it may be used.

Figure 15:
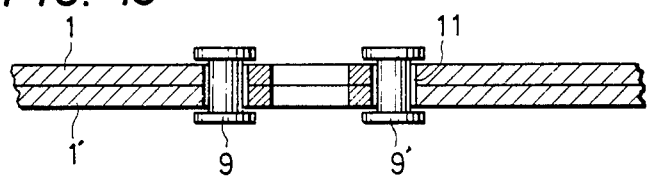
FIGS. 15 and 16 are a sectional view and a partially plan view, respectively, of the structure of a seventh embodiment of the present invention.
Figure 16:
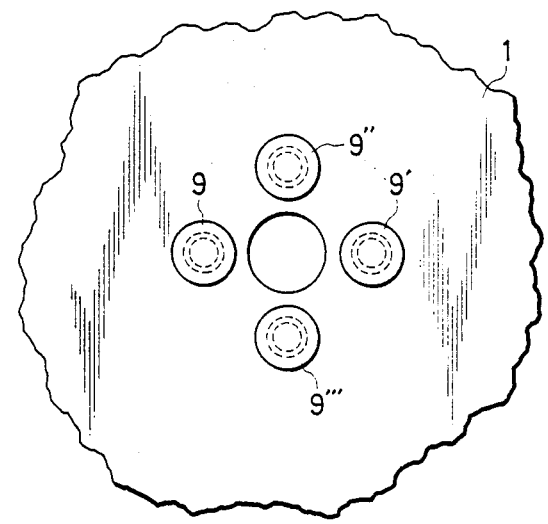

A seventh embodiment of the present invention is shown in FIGS. 15 and 16. In this embodiment, a plurality of small through holes are formed in the inner part of the optical disc consisting of the substrates 1 and 1', and metal pieces or magnetic materials 9, 9' . . . in the shape of a rivet such as those shown in FIG. 15 are inserted into the through holes. When the rivet-shaped members 9, 9' . . . are attracted by the magnet provided on the spindle, the head portions of the rivet-shaped members 9, 9' . . . attract the substrates 1, 1'. FIG. 16 is a plan view of the embodiment shown in FIG. 15, viewed from above. In FIG. 16, four rivet-shaped members 9, 9' . . . are disposed. The diameter of the rivet-shaped members 9, 9' . . . is made smaller than that of the small holes provided in the substrates 1, 1'.

Figure 17:
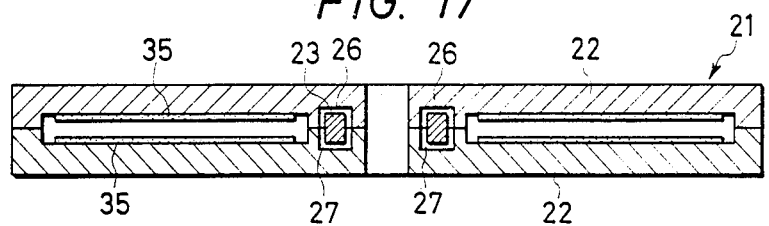
FIGS. 17 and 18 are a sectional view and a perspective view, respectively, of the structure of an eighth embodiment of the present invention.
Figure 18:
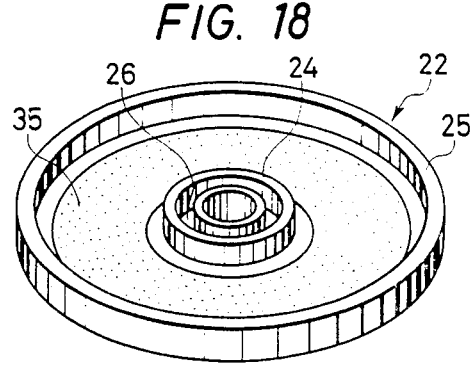

FIG. 17 is a sectional view of an eighth embodiment of an information recording disc according to the present invention. The reference numeral 21 denotes an information recording disc, 22 a transparent substrate, 23 a magnetic attracting member, and the same numerals are provided for the same elements as those shown in FIG. 12.

The transparent substrate 22 is provided with protrusions 24 and 25 on the inner and outer peripheral portions, respectively, of the side on which a recording film is formed. A groove 26 is formed on the protrusion 24 of the inner peripheral portion such that when two substrates 22 are bonded together, the corresponding joined grooves 26 form a gap.

The magnetic attracting member 23 is an annular magnetic material such as soft-iron or martensite stainless steel and is loosely fit into the gap 27 formed by the two bonded grooves 26 of the substrates 22.

The information recording disc of the eighth embodiment brings about similar effects to those of the other embodiments. In addition, since the magnetic attracting member 23 is housed in the information recording disc 21, it has a superior aesthetic appearance and can be widely used for both a conventional recording and reproducing apparatus provided with a pressing fixing means and an apparatus provided with a magnet attracting type cramp mechanism.

Figure 19:
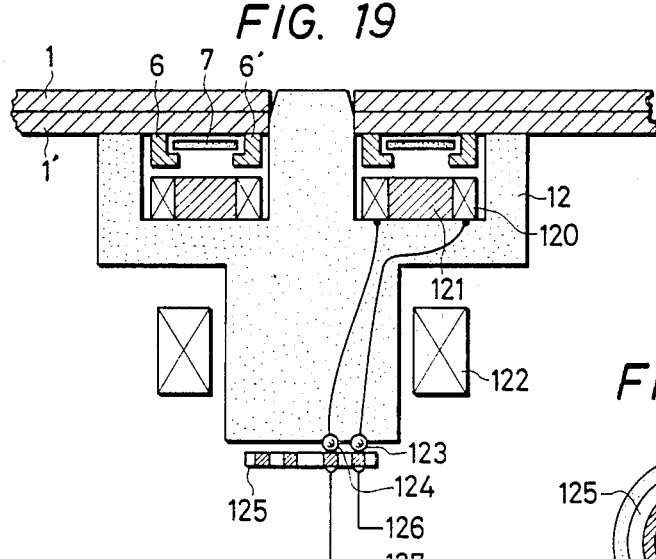
FIGS. 19 and 20 show a ninth embodiment of the present invention and, in particular, they are a sectional view and a partially elevational view, respectively, of a preferred spindle.
Figure 20:
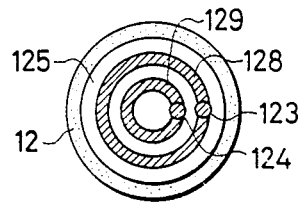

FIGS. 19 and 20 show a ninth embodiment of the present invention. This embodiment is effective for removing the information recording disc which is attracted to the spindle and has finished recording or reproduction from the spindle against the attractive force between the magnet and the metal piece or magnetic material.

In this embodiment, the permanent magnet attached to the spindle in the above-described embodiments is replaced by an electromagnet, so that the magnetic action is actuated only when the optical disc is attracted to the spindle 2 by applying current at that time only. As a result, it is possible to readily remove the optical disc from the spindle. In FIG. 19, the reference numeral 121 represents a core material of high permeability. It is preferably a rare earth material such as Sm - Co which enables a small-sized core to produce strong force. The reference numeral 120 is a coil wound around the core material 121. Since the electromagnet is rotated by a coil 122 together with the spindle 2, a disc 125 is necessary in order to supply current to the electromagnet. As shown in FIG. 20, the disc 125 is provided with concentric conductors 128 and 129 and is connected to a source by elements 126 and 127. The disc 125 is connected to the spindle 2 by ball-like members 123 and 124, which are connected to the coil 120 in the spindle.

Although double-sided recording discs of air sandwich type and the like are illustrated as information recording discs in the above embodiments, the present invention is not limited to these and is adaptable to an information recording disc of any other type. This invention is effective especially for a disc such as an optical information recording disc in which a minute strain offers a problem.

According to the present invention, since a metal piece or magnetic material is carried by an information disc by a method which does not generate retardation, it is possible to adopt a magnetic chuck system as a method of attracting a recording disc to the spindle, thereby enabling a recording and reproducing apparatus to be reduced in thickness.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An information recording disc comprising:
    an information recording disc member for recording and reproducing information;
    a magnetic attracting member; and
    holding means fixedly secured to said disc member and forming a space therein for holding said magnetic attracting member so that said magnetic attracting member is held in the space of said holding means without being fixedly secured to said disc member.

2. An information recording disc according to claim 1 wherein said magnetic attracting member is an annular member.

3. An information recording disc according to claim 1, wherein said magnetic attracting member is composed of a plurality of members in the shape of a rivet which are disposed in the vicinity of the central portion of said disc member.

4. An information recording disc according to claim 1, wherein said holding means includes a pair of opposed members having an L-shaped cross section.

5. An information recording disc according to claim 1, wherein said holding means includes a plurality of receiving holes formed in the vicinity of the central portion of said disc member from the top surface to the under surface thereof; and said magnetic attracting member is composed of an annular metal magnetic attracting plate with a plurality of connecting rods having a smaller diameter than that of said receiving holes implanted on one side thereof such as to have the same arrangement as said receiving holes, said connecting rods being loosely fit into the respective receiving holes, and another annular metal magnetic attracting plate which is secured to the end portions of said connecting rods protruding from the other side of said disc member.

6. An information recording disc according to claim 1, wherein said holding means includes an annular groove provided at the central portion of the information recording surface of each of two disc members; and said magnetic attracting member is loosely fit into a space formed by the abutted annular grooves of two disc members which are bonded together with said recording surfaces faced inward.

7. An information recording disc according to claim 1, wherein at least a portion of said magnetic attracting member which comes into contact with a surface of said disc member is coated with a film of a material having self lubricating properties.

8. An information recording disc according to claim 1, further comprising a spindle for holding said disc member, and another magnetic attracting member being held by said spindle and disposed at a position corresponding to the position of said magnetic attracting member held by said holding means, said magnetic attractive member attracting said disc member to said spindle and transmitting driving force through said spindle.

9. An information recording disc according to claim 8, wherein said holding means comprises a pair of opposed members having an L-shaped cross section, said another magnetic attracting member being inserted into a gap formed between said pair of opposed members having the L-shaped cross sections when said disc member is disposed on said spindle.

* * * * *